(12) United States Patent
Hunt et al.

(10) Patent No.: US 9,851,035 B2
(45) Date of Patent: Dec. 26, 2017

(54) QUICK CONNECTOR ASSEMBLY

(71) Applicants: Mitchell W. Hunt, Durand, MI (US); Matthew D. Lutzke, Clarkston, MI (US)

(72) Inventors: Mitchell W. Hunt, Durand, MI (US); Matthew D. Lutzke, Clarkston, MI (US)

(73) Assignee: A. RAYMOND ET CIE, Grenoble (FR)

( * ) Notice: Subject to any disclaimer, the term of this patent is extended or adjusted under 35 U.S.C. 154(b) by 113 days.

(21) Appl. No.: 14/548,741

(22) Filed: Nov. 20, 2014

(65) Prior Publication Data

US 2016/0146387 A1    May 26, 2016

(51) Int. Cl.
   *F16L 47/24*         (2006.01)
   *F16L 25/00*         (2006.01)
   *F16L 33/22*         (2006.01)
   *F16L 37/133*       (2006.01)
   *F16L 37/138*       (2006.01)

(52) U.S. Cl.
   CPC ........... *F16L 25/0072* (2013.01); *F16L 33/22* (2013.01); *F16L 37/133* (2013.01); *F16L 47/24* (2013.01); *F16L 37/138* (2013.01)

(58) Field of Classification Search
   CPC ... F16L 13/146; F16L 37/138; F16L 37/0842; F16L 37/122; F16L 25/0018; F16L 25/0072; F16L 33/22; F16L 33/23; F16L 47/24

USPC ........ 285/322, 324, 323; 403/285, 251, 309, 403/314

See application file for complete search history.

(56) References Cited

U.S. PATENT DOCUMENTS

| | | | | |
|---|---|---|---|---|
| 1,955,642 A | * | 4/1934 | Laughlin | B23B 31/202 279/104 |
| 2,890,900 A | * | 6/1959 | Williamson, Jr. | F16L 33/221 285/238 |
| 3,572,779 A | * | 3/1971 | Dawson | F16L 13/146 285/382.2 |
| 4,248,459 A | * | 2/1981 | Pate | F16L 3/1236 174/665 |

(Continued)

FOREIGN PATENT DOCUMENTS

| | | | | |
|---|---|---|---|---|
| DE | 2528757 A1 | * | 1/1977 | F16L 37/02 |
| FR | 1310713 A | * | 11/1962 | F16L 37/133 |

(Continued)

*Primary Examiner* — David E Bochna
*Assistant Examiner* — James A Linford
(74) *Attorney, Agent, or Firm* — Dickinson Wright PLLC

(57) ABSTRACT

The connector assembly includes a housing with an open bore which extends along an axis from an open first end to an open second end. The housing further includes a plurality of fingers that are spaced circumferentially from one another and are deflectable in a radial direction. At least one of the fingers has a plurality of teeth that are spaced axially from one another and extend into the open bore of the housing for biting into the first tube to resist pull out of the first tube from the open bore. Each of the teeth also extends by a height to a leading edge of an engagement surface which also includes an angled portion that extends at an angle relative to the axis. The axially spaced teeth have at least one of differing heights and differing angles of the angled portions.

16 Claims, 6 Drawing Sheets

(56) References Cited

U.S. PATENT DOCUMENTS

| | | | |
|---|---|---|---|
| 4,440,425 A * | 4/1984 | Pate | F16L 3/1236 |
| | | | 285/149.1 |
| 4,470,575 A * | 9/1984 | Stoll | F16L 37/133 |
| | | | 251/149.6 |
| 4,685,706 A | 8/1987 | Kowal et al. | |
| 4,875,715 A | 10/1989 | Dennany, Jr. et al. | |
| 4,923,227 A | 5/1990 | Petty et al. | |
| 6,279,963 B1 | 8/2001 | Hulsebos | |
| 7,455,328 B2 * | 11/2008 | Chelchowski | F16L 19/086 |
| | | | 285/247 |
| 7,695,025 B2 | 4/2010 | Ghidini | |
| 8,091,932 B2 | 1/2012 | Nijsen | |
| 9,719,620 B2 * | 8/2017 | Harnetiaux | F16L 33/222 |
| 2001/0030421 A1 * | 10/2001 | Hulsebos | F16L 21/04 |
| | | | 285/323 |
| 2002/0033604 A1 | 3/2002 | Minemyer | |
| 2008/0277922 A1 | 11/2008 | Ghidini | |
| 2011/0148105 A1 | 6/2011 | Nijsen | |
| 2011/0309614 A1 * | 12/2011 | Guest | F16L 37/0925 |
| | | | 285/323 |

FOREIGN PATENT DOCUMENTS

| | | | | |
|---|---|---|---|---|
| FR | 2644223 A1 * | 9/1990 | | B29C 45/006 |
| GB | 2398612 A | 8/2004 | | |
| WO | 2014018860 A1 | 1/2014 | | |

\* cited by examiner

QUICK CONNECTOR ASSEMBLY

BACKGROUND OF THE INVENTION

1. Field of the Invention

The present invention is related to connector assemblies for fluidly connecting pipes or tubes of similar or different materials to one another.

2. Related Art

The plumbing systems of many buildings in the United States include one or more of copper, chlorinated polyvinyl chloride (CPVC) and/or cross-linked polyethylene (PEX) pipes or tubes. Many plumbers prefer to work with pipes formed of PEX over the other materials for a number of reasons including, for example, flexibility, cost effectiveness, corrosion-resistance and resistance to bursting from freezing. Some pipe manufacturers produce copper or CPVC to PEX adapters for fluidly connecting PEX tubing with copper or CPVC piping. However, many of these adapter designs are costly, laborious to install (for example, some designs require adhesives or welding) or are otherwise unreliable. For example, some known adapters fail when exposed to fluids flowing through the connected tubes at very high pressures.

There remains a significant and continuing need for an improved connector assembly which overcomes any or all of the disadvantages associated with other known adapters.

SUMMARY OF THE INVENTION

One aspect of the present invention provides for a connector assembly for establishing fluid communication between a first tube and a second tube, which could be of the same or a different material from that of the first tube. The connector assembly includes a housing with an open bore which extends along an axis from an open first end to an open second end. The housing further includes a plurality of fingers that are spaced circumferentially from one another and are deflectable in a radial direction. At least one of the fingers has a plurality of teeth that are spaced axially from one another and extend into the open bore of said housing for engaging or biting into the first tube to resist pull out of the first tube from the open bore. Each tooth also extends by a height to a leading edge of an upper surface which also includes an angled portion that extends at an angle relative to the axis. The axially spaced teeth have at least one of differing heights and differing angles of the angled portions.

The improved connector assembly has been found to provide increased pull out resistance and to be able to withstand pressures being conveyed between the first and second tubes of up to 800 psi, which is significantly greater than those of other known connector assemblies.

According to another aspect of the present invention, the second open end of the housing is configured for receiving the second tube, and the housing has an outer surface which is configured for sealing with the first tube adjacent the first end.

According to yet another aspect of the present invention, the at least one finger has at least three axially spaced teeth including a first tooth adjacent the second open end of the housing and a second tooth and a third tooth which is furthest from the second open end.

According to still another aspect of the present invention, the angles of the at least three teeth decrease away from the second open end with the angle of the first tooth being approximately 38 degrees, the angle of the second tooth being approximately 33 degrees and the angle of the third tooth being approximately 28 degrees.

According to a further aspect of the present invention, both the heights and the angles of the at least three teeth decrease away from the second open end.

According to yet another aspect of the present invention, the at least three axially spaced teeth are a total of six teeth which integrally connected with one another in three rows of two and are in an overmolding engagement with the at least one finger.

According to still a further aspect of the present invention, said upper surface of each tooth additionally includes a flat portion which extends in parallel relationship with the axis and is disposed adjacent the leading edge.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
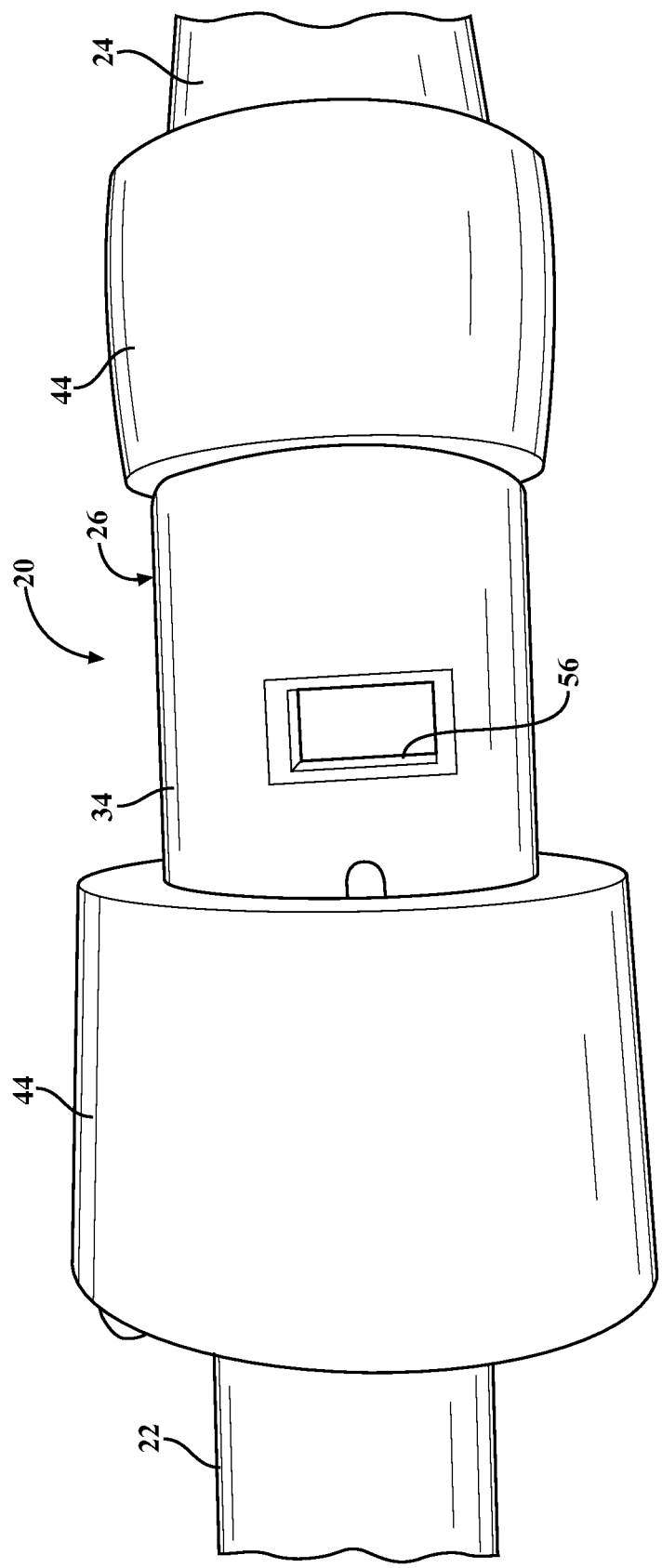
FIG. 1 is a perspective and elevation view of an exemplary quick connector assembly attached to a copper or CPVC pipe and a PEX tube.
Figure 3:
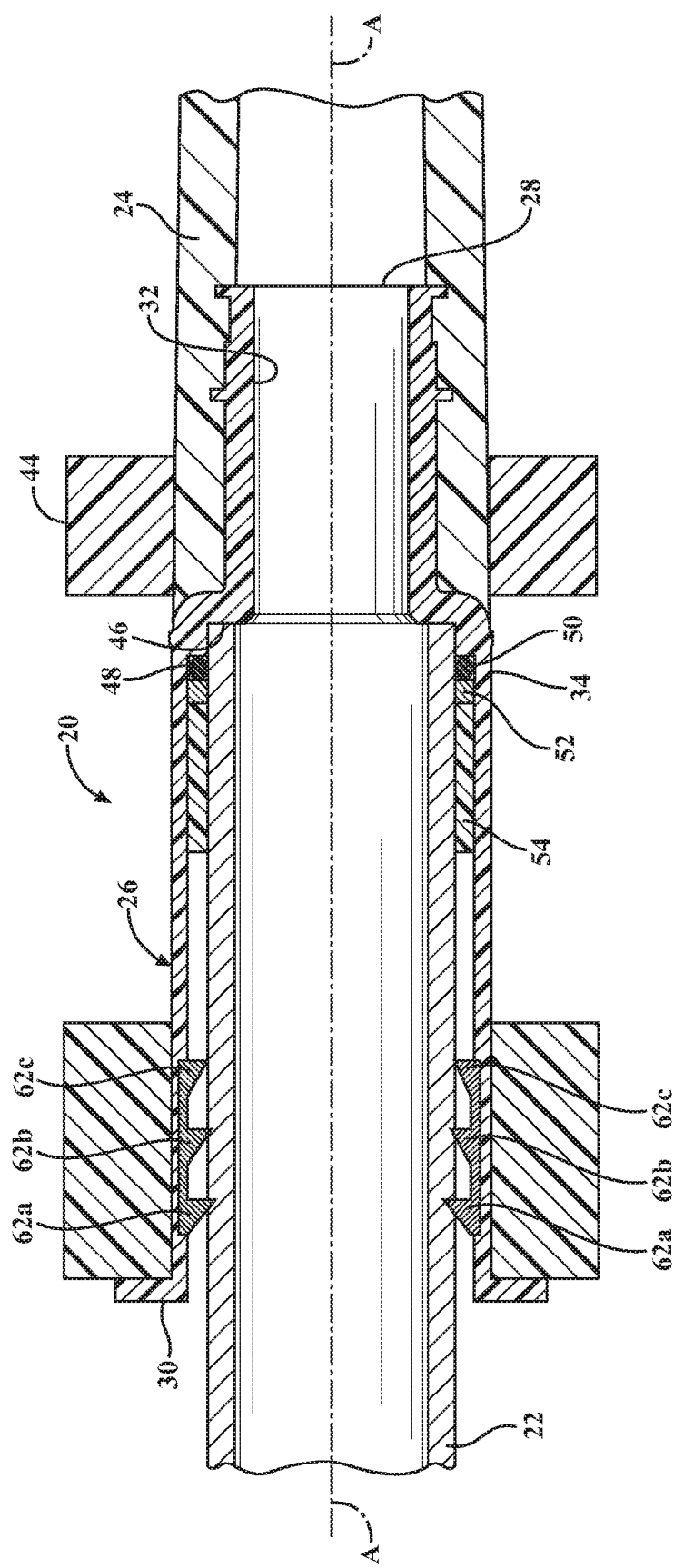
FIG. 3 is a cross-sectional view of the quick connector assembly of FIG. 1 in engagement with a copper or CPVC pipe and a PEX tube.

Referring to the Figures, wherein like numerals indicate corresponding parts throughout the several views, FIGS. 1 and 3 show an exemplary embodiment of a quick connector assembly 20 in engagement with and establishing fluid communication between a first tube 22 of a first material and a second tube 24 of a second material. In the exemplary embodiment, the first tube 24 of the exemplary embodiment is of a cross-linked polyethylene (PEX) material and is hereinafter referred to as the "PEX tube 24". The second material of the second tube 22 is copper or a chlorinated polyvinyl chloride (CPVC) material and is hereinafter referred to as the "copper or CPVC pipe 22". As such, the exemplary quick connector assembly 20 may find uses in the plumbing systems of many residential, industrial or commercial buildings by serving as a bridge between existing copper or CPVC piping in the building and new PEX tubing. However, it should be appreciated that the first and second materials could be similar (for example, both tubes could be of PEX), and the quick connector assembly 20 could also find uses in a range of applications other than the plumbing systems of buildings.

Figure 4:
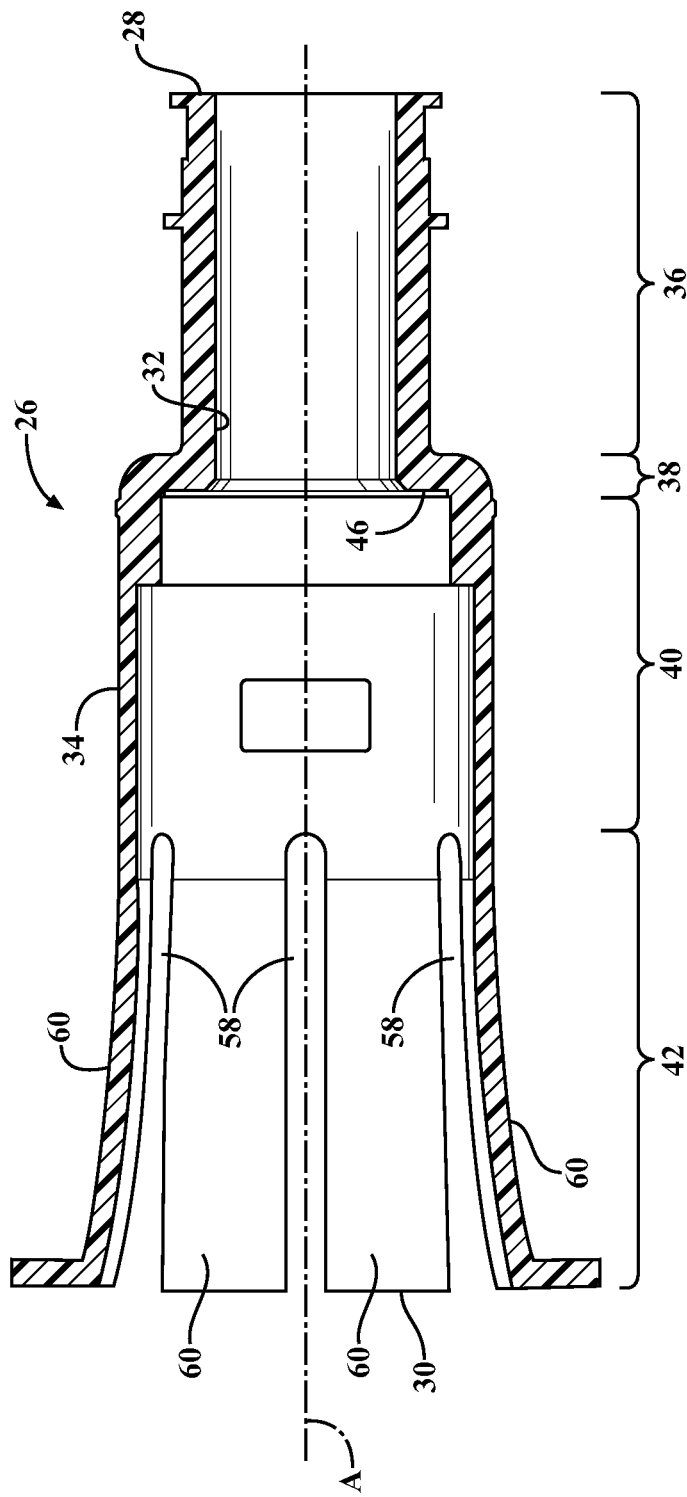
FIG. 4 is a cross-sectional view of a housing of the quick connector assembly of FIG. 1.
Figure 5:
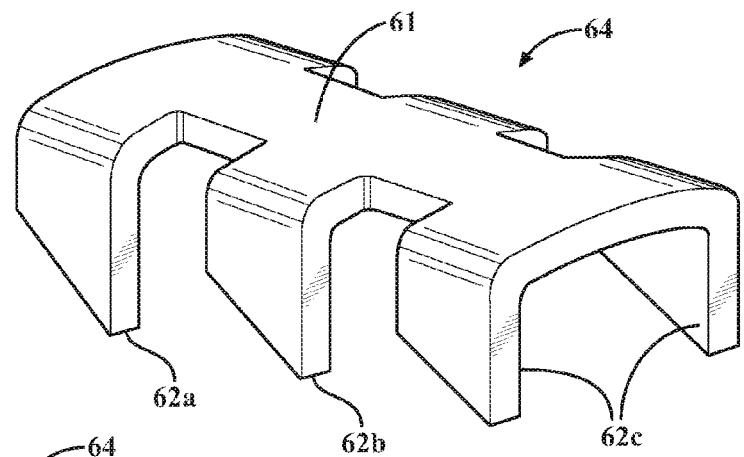
FIG. 5 is an isometric view of an exemplary piece including a plurality of teeth from the quick connector assembly of FIG. 1.
Figure 6:
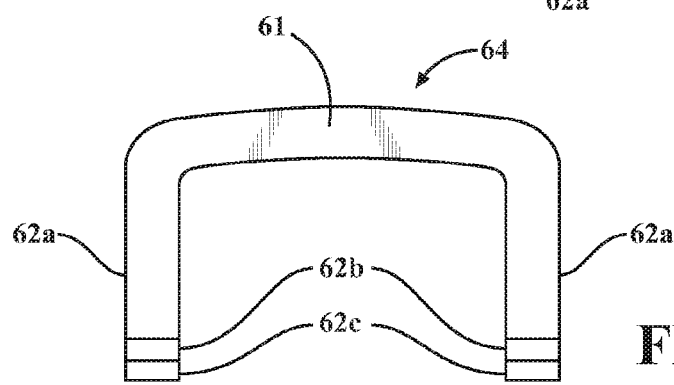
FIG. 6 is a front view of the exemplary piece of FIG. 5.

Referring now to FIG. 4, the exemplary quick connector assembly includes a housing 26 with an open bore that extends along an axis A from an open first end 28 for receiving the PEX tube 24 to an open second end 30 for receiving copper or CPVC pipe 22. The housing 26 presents an inner surface 32 which defines the open bore and an outer surface 34. Between the first and second ends 28, 30, the housing 26 serially extends through a first end section 36, a first intermediate section 38, a second intermediate section 40 and a second end section 42. The outer surface 34 of the first end section 36 is formed according to ASTM F-1960 standards to establish a fluid connection with the PEX tube 24 (shown in FIGS. 1 and 3) through a standard expansion connection with a PEX expansion ring 44 (shown in FIGS. 1 and 3). However, it should be appreciated that the first end section 36 could be configured for attachment with the PEX tube 24 through any suitable style of connection including, for example, shark bite connections, compression connections, crimping connections, clamping connections or pressing connections. The housing 26 is preferably made of as one integral piece of a polymeric material and is preferably formed through an injection molding process. However, it should be appreciated that the housing 26 may be made of any suitable materials and through any suitable forming processes.

The inner surface 32 of the housing 26 includes a first shoulder 46 which faces towards the open second end 30 and which separates the first end section 36 from the first intermediate section 38. As shown in FIG. 3, the first shoulder 46 defines a stopping point for the insertion of the copper or CPVC pipe 22 into the open bore of the housing 26.

The inner surface 32 of the housing 26 further includes a second shoulder 48 which also faces towards the open second end 30 and which separates the first and second intermediate sections 38, 40 of the housing 26. As shown in FIG. 3, in use, the second shoulder 48 receives and supports an O-ring 50 (or any suitable type of seal), which is positioned in the second intermediate section 40 of the open bore for establishing a fluid tight seal between the copper or CPVC pipe 22 and the housing 26, as discussed above. An annular spacer 52 is also disposed in the second intermediate section 40 of the open bore on the other axial side of the O-ring 50 for maintaining the O-ring 50 in contact with the second shoulder 48.

Figure 2:
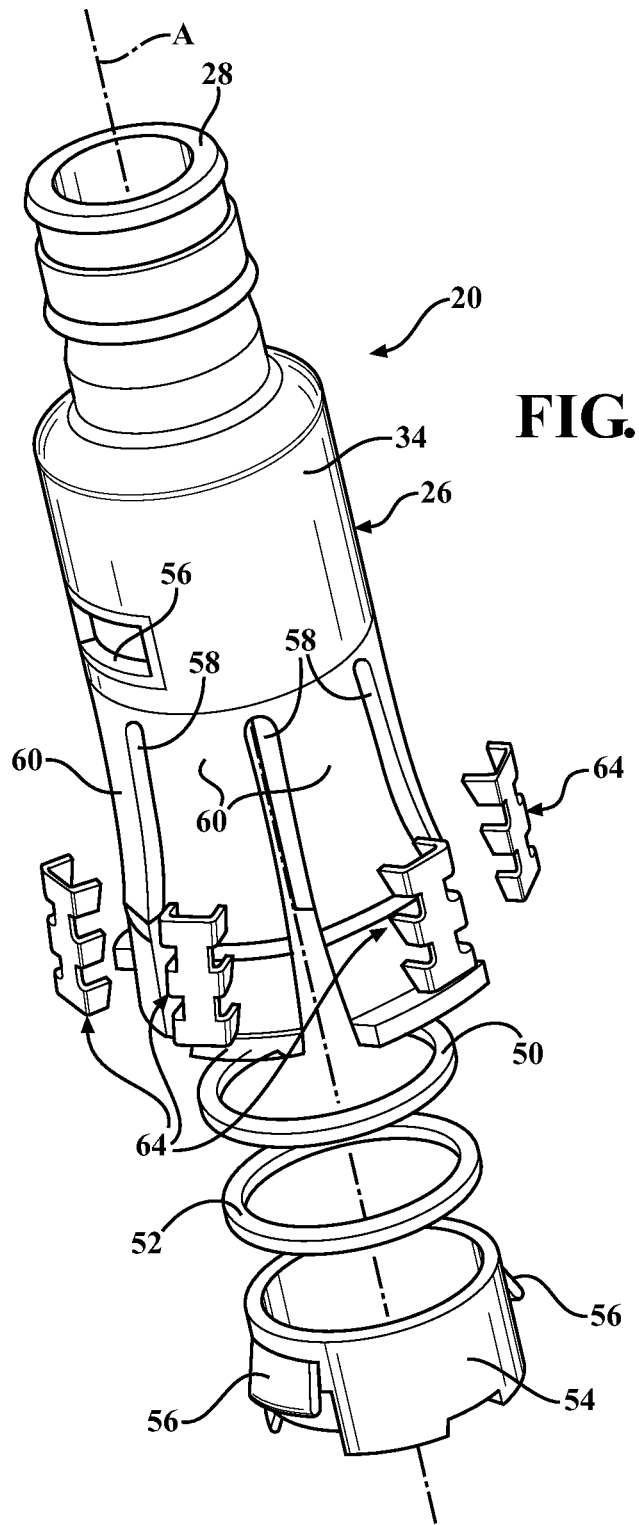
FIG. 2 is an exploded view of the quick connector assembly of FIG. 1.

As shown in FIGS. 2 and 3, a generally cylindrically shaped insert 54 is also disposed in the second intermediate section 40 of the housing 26 and includes a pair of tabs 56 which extend radially outwardly through windows in the housing 26 for holding the spacer 52 and the O-ring 50 in the predetermined locations shown in FIG. 3. The tabs 56 allow the housing 26, O-ring 50, spacer 52 and the insert 54 to be pre-assembled and packaged into a single assembly which may then be removed from the package and used without any additional assembly steps.

Referring back to FIG. 4, the second end section 42 of the exemplary housing 26 includes a plurality of circumferentially spaced slits 58 which extend in an axial direction from the second open end 30 of the housing 26 to the second intermediate section 40. Between adjacent ones of the slits 58, the housing 26 has fingers 60 which extend axially from the second end 28 to living hinges 61 which interconnect the fingers 60 with the second intermediate section 40 of the housing 26. The living hinges 61 allow the fingers 60 to deflect radially inwardly and outwardly.

The fingers 60 of the exemplary quick connector assembly 20 include a plurality of teeth 62a, 62b, 62c which extend radially inwardly from the inner surfaces 32 of the fingers 60 to engage or bite into the copper or CPVC pipe 22, thereby restricting pull-out of the copper or CPVC pipe 22 from the open bore of the housing 26. In other words, the teeth 62a, 62b, 62c lock the copper or CPVC pipe 22 into the position of FIG. 3. The teeth 62a, 62b, 62c of the exemplary embodiment are partially embedded within the fingers 60. For example, the teeth 62a, 62b, 62c could be partially embedded within the fingers 60 through an overmolding process.

The fingers 60 are sloped radially outwardly, or away from the axis A, towards the second open end 30 of the housing such that during insertion of the copper or CPVC pipe 22 into the open bore of the housing 26, the teeth 62a, 62b, 62c either do not touch the copper or CPVC pipe 22 or lightly touch the copper or CPVC pipe 22 to prevent or limit scratching of the copper or CPVC pipe 22. Depending on the slopes of the fingers 60, if the teeth 62a, 62b, 62c do touch the copper or CPVC pipe 22 during the insertion process, the fingers 60 flex outwardly to prevent scratching of the copper or CPVC pipe 22.

In another embodiment, as opposed to the sloped fingers 60 in the preferred embodiment described above, the fingers 60 are curved concavely away from axis A. Similar to the function associated with the sloped fingers 60 in the preferred embodiment, the fingers 60 curved concavely away from axis A also permit the teeth 62a, 62b, 62c to either not touch the copper or CPVC pipe 22 or lightly touch the copper or CPVC pipe 22 to prevent or limit scratching of the copper or CPVC pipe 22 upon insertion.

In the exemplary embodiment, the fingers 60 are curved concavely to enlarge the opening for receiving the copper or CPVC pipe 22. Alternately, the fingers 60 could be angled outwardly relative to the axis A. For example, the fingers 60 could be angled relative to the axis A at an angle of approximately three degrees.

Referring now to FIGS. 3 and 5-9, the teeth 62a, 62b, 62c are disposed on clips 64, each of which includes a spine 61 and six teeth 62a, 62b, 62c disposed in three rows of two and wherein an end of each tooth 62a, 62b, 62c is transversely offset from the spine 61. Specifically, each clip 64 includes a first row of teeth 62a which are disposed adjacent the second end 30 of the housing 26, a second row of teeth 62b and a third row of teeth 62c which are disposed furthest away from the second end 30. The teeth 62a, 62b, 62c are preferably formed of a corrosion resistant metal such as stainless steel but may be formed of any suitable metal or any other suitable type of material.

Figure 7:
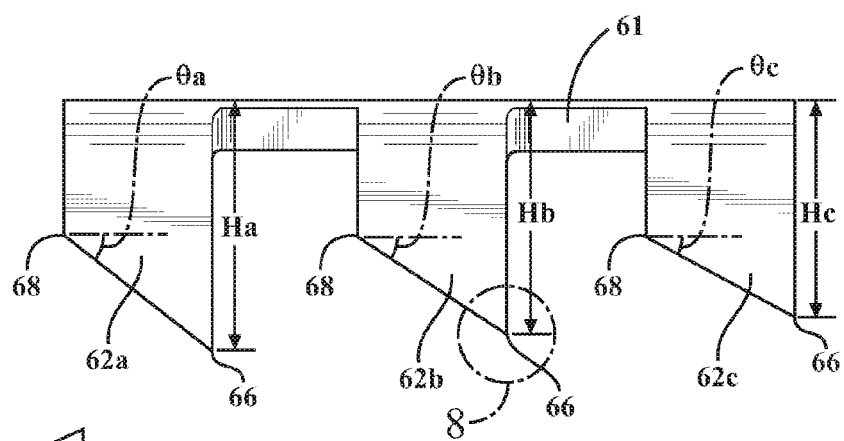
FIG. 7 is a side view of the exemplary piece of FIG. 5.
Figure 8:
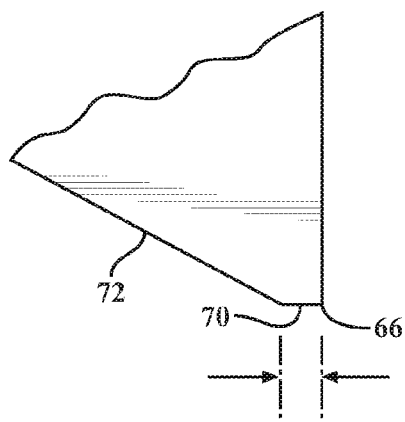
FIG. 8 is an enlarged view of a portion of one of the teeth of the piece shown in FIG. 7.
Figure 9:
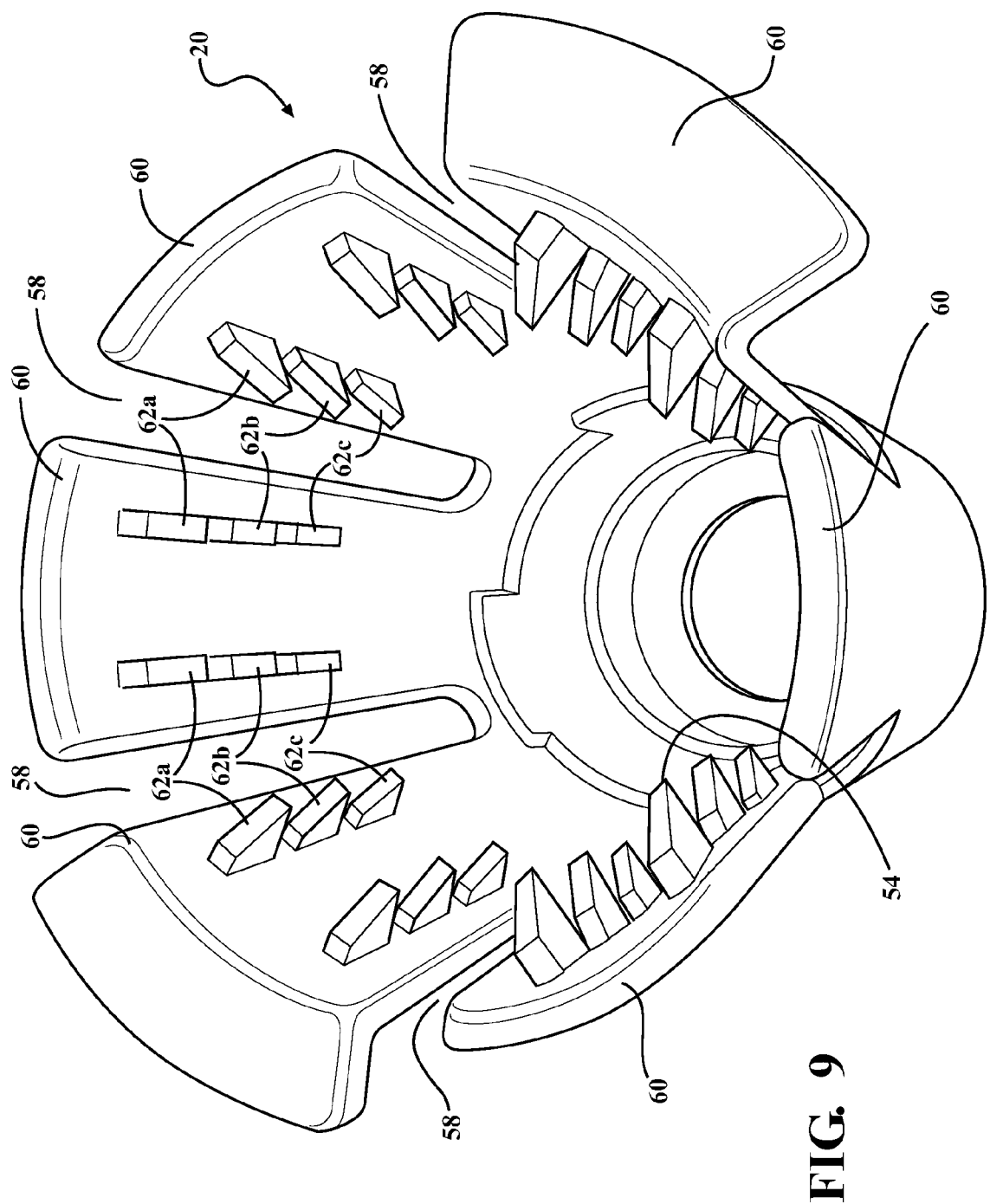
FIG. 9 is an isometric view of the exemplary quick connector assembly of FIG. 1.

Referring now to FIGS. 3, 7 and 8, each tooth 62a, 62b, 62c has an engagement surface which extends from a leading (or biting) edge 66 to a trailing edge 68. The leading edges 66 of the teeth 62a, 62b, 62c face towards the first end 28 of the housing 26 for biting into the copper or CPVC pipe 22 to resist pull out of the copper or CPVC pipe 22 from the open bore of the housing 26. In one embodiment, the engagement surface of each tooth includes a generally flat portion 70 and an angled portion 72 which extends at an angle $\theta_a$, $\theta_b$, $\theta_c$ relative to the axis and to the base of the clips 64. It should be appreciated that such flat portion 70 may also be formed as a sharp or rounded corner portion. In the exemplary embodiment, each of the fingers 60 includes one of the clips 64 with the teeth 62a, 62b, 62c for biting into the copper or CPVC pipe 22. The living hinges 61 and the angled portions 72 of the engagement surfaces of the teeth 62a, 62b, 62c allow the copper or CPVC pipe 22 to be easily inserted past the teeth 62a, 62b, 62c with very little force by permitting the fingers 60 to deflect radially outwardly at the living hinges 61 as the copper or CPVC pipe 22 encounters the angled portions 72 of the teeth 62a, 62b, 62c.

In each row, the teeth 62a, 62b, 62c are similarly shaped with one another, but the angles $\theta_a$, $\theta_b$, $\theta_c$ of the engagement surfaces and heights $H_a$, $H_b$, $H_c$ to the leading edges 66 vary between the rows. Specifically, the angles $\theta_a$, $\theta_b$, $\theta_c$ of the engagement surfaces decrease from the first row of teeth 62a to the third row of teeth 62c, and the heights $H_a$, $H_b$, $H_c$ decrease from the first row of teeth 62a to the third row of teeth 62c. In the exemplary embodiment, the first angle $\theta_a$ is approximately 38°, the second angle $\theta_b$ is approximately 33° and the third angle $\theta_c$ is approximately 28°. This particular configuration has been found to allow the fluid connector assembly 20 to be able to maintain an effective seal between the copper or CPVC pipe 22 and the PEX tube 24 at pressures of upwards of 800 psi.

In the exemplary embodiment, the fingers 60 are deflected radially inwardly to increase the engagement or biting force of the teeth 62a, 62b, 62c into the copper or CPVC pipe 22 by a PEX expansion ring 44. The PEX expansion ring 44 is inserted around the outer surfaces 34 of the fingers 60 and self-contracted around the fingers 60 to bias the leading edges 66 of the teeth 62a, 62b, 62c into the copper or CPVC pipe 22. Alternately, a crimping or a clamping ring could be used to bias the teeth into the copper or CPVC pipe 22.

The process of fluidly connecting a copper or CPVC pipe 22 with a PEX tube 24 using the exemplary quick connector assembly 20 is described as follows. First, a user, inserts the copper or CPVC pipe 22 into the housing 26 through the open second end 30 until it contacts the first shoulder 46. This ensures that a fluid-tight seal with the copper or CPVC pipe 22 by the O-ring 50. During this process, the fingers 60 will resiliently deflect outwardly as the end of the copper or CPVC pipe 22 passes the teeth 62a, 62b, 62c. Next, the user expands a PEX expansion ring 44 and slides it over the housing 26 until the PEX expansion ring 44 is aligned with the fingers 60. The PEX expansion ring 44 is then allowed to contract around the fingers 60 to bias the teeth 62a, 62b, 62c against the copper or CPVC pipe 22. The PEX tube 24 may then be fluidly connected with the first end section 36 of the housing 26 through any suitable process. This entire process is very quick and requires no adhesives, soldering or other specialty tools other than the PEX expander, which many plumbers who work with PEX tubing already will have. The resulting connection between the copper or CPVC pipe 22 and the PEX tube 24 is more secure and fluid-tight than the connections established by using other known adapters or connector assemblies. Even further, the connector assembly 20 does not require any brass, lead or other metals which could contaminate the fluid flowing between the copper or PVC pipe 22 and the PEX tube 24.

Obviously, many modifications and variations of the present invention are possible in light of the above teachings and may be practiced otherwise than as specifically described while within the scope of the appended claims.

The invention claimed is:

1. A connector assembly for connecting and establishing fluid communication between a first tube and a second tube, comprising:
   a housing made as a single monolithic piece with an open bore which extends along an axis from an open first end to an open second end;
   at least one sealing element disposed in said open bore for establishing a fluid tight seal between said housing and one of the first and second tubes;
   said monolithic housing including a plurality of fingers that are spaced circumferentially from one another and are deflectable in a radial direction;
   a plurality of rows wherein each row contains a plurality of teeth interconnected with one another through a spine which is at least partially embedded within at least one of said fingers, each row of teeth being spaced axially from one another, an end of each tooth being transversely offset from said spine, and each tooth extending into said open bore of said housing for engaging into the first tube to resist pull out of the first tube from said open bore;
   each of said teeth having a triangular portion which projects into said open bore, said triangular portion having a front surface which extends perpendicularly to said axis and a back surface which is angled relative to said axis by less than ninety degrees;
   wherein at least one of said front surfaces of said axially spaced teeth have differing heights and said back surfaces of said axially spaced teeth extend at differing angles relative to said axis; and
   wherein said teeth are made of metal for biting into the first tube or second tube.

2. The connector assembly as set forth in claim 1 wherein said at least one finger has at least three axially spaced teeth including a first tooth adjacent said second open end of said housing and a second tooth and a third tooth which is furthest from said second open end.

3. The connector assembly as set forth in claim 2 wherein angles of said back surfaces of said at least three teeth relative to said axis decrease away from said second open end.

4. The connector assembly as set forth in claim 3 wherein said angle of said back surface of said first tooth relative to said axis is approximately 38 degrees, said angle of said back surface of said second tooth relative to said axis is approximately 33 degrees and said angle of said back surface of said third tooth is approximately 28 degrees.

5. The connector assembly as set forth in claim 2 wherein said heights of said at least three teeth decrease away from said second open end.

6. The connector assembly as set forth in claim 2 wherein both said angles of said back surfaces of said at least three teeth and said heights of said front surfaces of said at least three teeth decrease away from said second open end.

7. The connector assembly as set forth in claim 1 wherein said at least three axially spaced teeth is further defined as six teeth which are integrally connected together in a clip and are disposed in three rows of two.

8. The connector assembly as set forth in claim 7 wherein said integrally connected teeth are partially embedded within said at least one finger.

9. The connector assembly as set forth in claim 1 wherein each of said teeth presents a flat surface which extends between said front surface and said back surface and which extends parallel to said axis.

10. The connector assembly as set forth in claim 1 wherein each of said fingers includes a plurality of said axially spaced teeth.

11. The connector assembly as set forth in claim 1 wherein said fingers of said housing are separated from one another by slots.

12. The connector assembly as set forth in claim 1 wherein said fingers are sloped radially outwardly away from said axis to enlarge said second open end of said housing for preventing or scratching of the first tube during insertion into said open bore of said housing.

13. The connector assembly as set forth in claim 1 wherein said fingers are curved concavely away from said axis to enlarge said second open end of said housing for preventing or limiting scratching of the first tube during insertion into said bore of said housing.

14. The connector assembly as set forth in claim 1 further including a tube of cross-linked polyethylene engaged with an outer surface of said housing and and a copper or CPVC pipe partially received in said open bore of said housing and wherein said teeth bite into said copper or CPVC pipe for resisting detachment of said copper or CPVC pipe from said housing.

15. The connector assembly as set forth in claim 1 further including a spacer received in said open bore of said housing adjacent said sealing element.

16. The connector assembly as set forth in claim 15 further including an insert received in said open bore and engaged with said housing to retain said spacer and said sealing element in said open bore.

\* \* \* \* \*